Oct. 29, 1963 S. SAMUEL 3,109,105
MONOSTABLE TRIGGER CIRCUITS
Filed Jan. 6, 1960
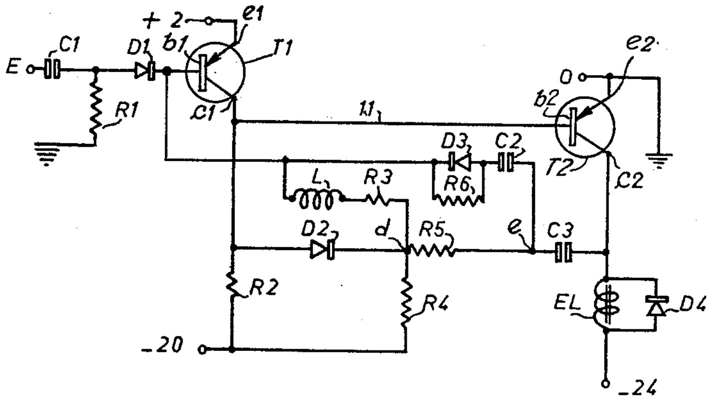

United States Patent Office 3,109,105
Patented Oct. 29, 1963

3,109,105

MONOSTABLE TRIGGER CIRCUITS

Sergiu Samuel, Paris, France, assignor to Compagnie des Machines Bull (Société Anonyme), Paris, France Filed Jan. 6, 1960, Ser. No. 760
Claims priority, application France Jan. 29, 1959
2 Claims. (Cl. 307—88.5)

This invention relates to trigger circuits comprising transistors and more especially to a trigger circuit of this type which has only one stable state.

The invention has for its object to provide a monostable trigger circuit comprising two transistors which is capable of supplying relatively high power to a load circuit. In its most immediate application, the trigger circuit according to the inveniton is intended for the direct feed of the winding of an electromagnet for driving an accumulator wheel in an accounting machine.

Power transistors as at present known have a relatively long triggering time. It is therefore difficult to use them in a trigger circuit which is to be controlled by electric pulses of very short duration. This is the case more especially when a monostable circuit is to establish a functional connection between electronic storage devices and electromechanical control members.

The monostable trigger circuit according to the invention is capable of supplying energy corresponding to about 20 volt-amperes for several milliseconds and can nevertheless change very rapidly from its stable state, called the quiescent state, to its triggered state under the action of an input pulse having a duration of only 2 to 3 microseconds.

The monostable circuit according to the invention comprises a first low-power transistor, i.e. one having a rapid commutating action, to the base of which the control pulse is applied. The load impedance of the second transistor, of a power type, consists of the winding of an electromagnet. With due regard to the bias voltages applied to the arrangement, the various elements are so adapted that, during the period of the stable state, the first transistor is conductive and the second non-conductive.

As is known from the existing art, a direct connection is established between the collector of the first transistor and the base of the second transistor, and a connection comprising a first capacitor is established between the collector of the second transistor and the base of the first. This capacitor forms part of a network having a time constant, which is one of the factors determining the interval of time during which the arrangement remains in its unstable state.

A particular feature resides in that the said network comprises two resistors, the first junction point of which is connected by a resistive link to the base of the first transistor.

Means are provided to increase the rapidity of the feedback from the second transistor to the base of the first at the change from the stable state to the unstable state, in the course of which the states of conduction are reversed. These means comprise, on the one hand, additional capacitor connecting one electrode of the first capacitor to the base of the first transistor through a diode, and on the other hand, a self-inductance winding inserted in the aforesaid resistive link.

For a better understanding of the invention and to show how it may be carried into effect, the same will now be described, by way of example, with reference to the single FIGURE of the accompanying drawing wherein there is illustrated a monostable circuit arrangement according to one embodiment of the invention.

Referring to the drawing, T1 is the first transistor, the base *b1* of which can receive any pulse applied to the input E and differentiated by the circuit comprising notably C1 and R1. The crystal diode D1 transmits only the positive peak of the differentiated pulse.

The potential of the emitter *e2* of the transistor T2 is equal to earth potential, while that of the emitter *e1* of the transistor T1 is at a higher level by reason of its connection to a voltage source at a potential of +2 volts. Owing to the conductor 11 of zero impedance, the potential of the base *b2* is always equal to that of the collector *c1*.

The condenser C3 and the resistances R4, R5 form the time-constant network serving to fix the duration of the unstable state of the system. While in a known arrangement the left-hand electrode of the capacitor C3 could be directly connected to the base *b1*, in the present case the connection comprises a capacitor C2 of much lower capacitances than C3, and the crystal diode D3 shunted by resistor R6. On the other hand, a connection comprising the self-inductance winding L and the resistor R3 is established between the base *b1* and the junction point *d* between R4 and R5. A crystal diode D2 has the effect of providing a low-impedance path when the voltage of the point *d* tends to become lower than that of the collector *c1*. The load in the collector circuit *c2* consists of the electromagnet EL.

Suitable p-n-p-junction transistors for the application envisaged are the types Oc45 and Oc16 for T1 and T2 respectively. By way of purely illustrative example, the order of magnitude of the elements employed may be as follows:

| | | | | | |
|---|---|---|---|---|---|
| R1 | ohms | 47,000 | R6 | ohms | 56,000 |
| R2 | do | 560 | C1 | nanofarad | 1 |
| R3 | do | 560 | C2 | do | 5 |
| R4 | do | 5,600 | C3 | microfarads | 2.5 |
| R5 | do | 1,000 | L | microhenrys | 800 |

During the stable or quiescent state, the potential of the collector *c1* is substantially higher than +1 volt owing to the considerable collector current flowing in R2, so that T2 is in its blocked, i.e. non-conductive, state, owing to the inverse biasing of its base in relation to its emitter. In this state, the capacitor C3 is charged with a voltage of about twenty volts.

It will be assumed that there is applied to the input E a pulse of positive direction, of a duration of from 2 to 3 microseconds and of an amplitude higher than 2 volts.

The potential of *b1* rises rapidly above +2 volts, so that the collector current of the transistor T1 is rapidly interrupted, for example in less than one microsecond. The voltage variation in the negative sense which results therefrom is instantly transmitted from *c1* to *b2*, so that T2 commences to become conductive as soon as the base *b2* becomes negative.

As the collector current of T2 commences to flow through the load EL, the potential of the collector *c2* rises and this voltage variation is transmitted to the base *b1* through a low-impedance path. This produces a cumulative effect, which further increases the rapidity of the rise of the potential of the base *b1*. It is here that the functions of the capacitor C2 and of the diode D3 are important for the feedback effect by reason of the fact that their impedance is negligible as compared with the resistor R5, the self-inductance of the winding L then acting to prevent a current from being shunted through L and R3 in series during the feedback process, because, for a voltage variation of the order of microseconds, the impedance of these elements is substantially greater than 1,000 ohms.

In a power transistor of the type employed, the collector current reaches its final value only after several tens of microseconds. At this instant, the potential of the collector $c2$ becomes stabilised at about −0.5 volt, while, since the capacitor C3 is still charged, a potential difference of +20 volts exists between its left-hand and right-hand electrodes. This means that at this instant the potential of $b1$ is about +15 volts.

The capacitor C3 then commences to discharge and, as is known, it is the time constant of the network C3, R5, R4 which will determine the time during which T2 will remain conductive, taking into account the voltages of the voltage sources. Since the potential of the point $e$ would tend to approach the voltage −20 volts in the course of the discharging process, and since the potential of the point $d$ is always lower than that of the point $e$, the potential of the base $b1$ will pass through the value +2 volts in a lapse of time shorter than the aforesaid time constant. Although the latter is about 15 milliseconds in the application described, the transistor T1 is de-blocked at the end of a discharge process of a duration of about 6 milliseconds. From this instant, T1 tends to become conductive again. In fact, as soon as the potential of $b1$ falls below that of the emitter $e1$, the establishment of the collector current commences and since this current is added, in R2, to the base current ($b2$) already flowing therein, the potential of $c1$, and consequently of $b2$, rises. Since this potential can rapidly reach +1 volt, it will be seen that the conduction of T2 is very rapidly interrupted.

The recharging process of the capacitor C3 then commences through a circuit which now has a reduced time constant. From the instant when the potential of the collector $c2$ falls towards −24 volts, the current intended for charging C3 flows through the resistor R5, a small portion of which current may emanate from the current of the base $b1$ through L and R3, and a larger portion from the current of the collector $c1$, which latter portion passes through the diode D2 as soon as the potential of the point $d$ is substantially below that of $c1$. The function of the resistance R6 in shunt with D3 is to regularise and shorten at this instant the recharging process of the condenser C2.

The presence of the diode D4 in shunt with the winding EL of the electromagnet reduces the amplitude of the inverse voltage increase set up across its terminals, which would be dangerous to the transistor T2 when the latter ceases to be conductive.

It will be noted that, owing to the direct connection between $b2$ and $c1$, the base current of the transistor T2 in its fully conductive state is substantially equivalent to the collector current of the transistor T1 when the latter is conductive.

There is no particular difficulty in adapting the arrangement hereinbefore described, notably for use in other types of transistors or under other conditions.

I claim:

1. In a monostable trigger circuit arrangement including a first transistor and a second transistor, the latter being a high power transistor and each having emitter, base and collector electrodes, voltage source means for supplying current to the transistors, a conductor for connecting the collector of said first transistor to the base of said second transistor, means for differently biassing the emitters of said transistors to determine a stable state of the arrangement in which only said first transistor is conducting, a first capacitor and a first resistor connected in series relationship, one plate of said capacitor being connected to the collector of said second transistor and an extremity of said resistor being connected to a fixed voltage point of one of said source means, said capacitor and resistor having values to condition the duration of a quasi-stable state, means to apply a trigger pulse to the base of said first transistor, the improvement consisting in two parallel branch circuits for connecting the base of said first transistor to the other plate of said capacitor and to said resistor, one of said branch circuits including an inductor and a second resistor in series, said inductor being adapted to present a high dynamic impedance to the voltage surge of said trigger pulse, the other of said branch circuits including a second capacitor in series with a diode which is poled to present its back resistance to the trigger pulse when applied to the base of said first transistor.

2. In a monostable trigger circuit arrangement including a first transistor and a second transistor the latter being a high power transistor, each having emitter, base and collector electrodes, sources of unidirectional electrical energy connected to supply current to the transistors, means to connect the collector of said first transistor to the base of said second transistor, means for biassing the emitters of both transistors to determine a quiescent condition of the arrangement in which only said first transistor is conducting, a time constant network with a resistor and a first capactor, one plate of which is connected to the collector of said second transistor, means to transmit an input pulse to the base of said first transistor, the improvement consisting in two parallel branch circuits for connecting the base of said first transistor to an intermediate point of said network, one of said branch circuits comprising a resistive inductor adapted momentarily to oppose a high counter-electromotive force against said input pulse, the other of said branch circuits comprising a second capacitor in series with a diode which is poled to present its back resistance to the input pulse applied to the base of said first transistor.

References Cited in the file of this patent

UNITED STATES PATENTS

| | | |
|---|---|---|
| 2,831,113 | Weller | Apr. 15, 1958 |
| 2,935,690 | Bergfors | May 3, 1960 |
| 2,945,966 | Davenport | July 19, 1960 |
| 2,949,545 | White | Aug. 16, 1960 |
| 2,968,748 | Davenport | Jan. 17, 1961 |

OTHER REFERENCES

Sultzer: "Junction Transistor Circuit Application," August 1953, in Electronics, pages 170–173.